United States Patent [19]

Loew et al.

[11] 4,245,990

[45] Jan. 20, 1981

[54] PROCESS FOR PRODUCING SOLUTIONS OF SALTS OF WATER-SOLUBLE CARBOXYLIC ACIDS OF CATIONIC DYES OR OPTICAL BRIGHTENERS

[75] Inventors: Peter Loew, Münchenstein; Walter Lang, Pfeffingen, both of Switzerland

[73] Assignee: Ciba-Geigy Corporation, Ardsley, N.Y.

[21] Appl. No.: 971,764

[22] Filed: Dec. 21, 1978

[30] Foreign Application Priority Data

Dec. 28, 1977 [CH] Switzerland ................ 16110/77

[51] Int. Cl.$^3$ ............................................. C09B 67/00
[52] U.S. Cl. ....................................... 8/582; 8/594; 8/609; 8/654
[58] Field of Search ............. 8/1 W, 92, 177 AB, 93

[56] References Cited

U.S. PATENT DOCUMENTS 4,095,943  6/1978  Lange et al. ..................... 8/92

FOREIGN PATENT DOCUMENTS 1148570  4/1969  United Kingdom.
1208238  10/1970 United Kingdom.
1236882  6/1971  United Kingdom.
1333937  10/1973 United Kingdom.
1349511  4/1974  United Kingdom.
1352191  5/1974  United Kingdom.

Primary Examiner—A. Lionel Clingman
Attorney, Agent, or Firm—Prabodh I. Almaula; Edward McC. Roberts

[57] ABSTRACT

A process for producing solutions of salts of water-soluble carboxylic acids of cationic dyes or optical brighteners, the solutions of cationic dye salts or brighteners salts which are obtained by this process and which are miscible with water in any proportion, and the use of these solutions for preparing dye liquors and printing pastes for dyeing, optical brightening and printing of, in particular, synthetic textile materials, which process comprises reacting the halide of a cationic dye or brighteners, in an aqueous or anhydrous medium, with at least one water-soluble carboxylic acid in the presence of an epoxide compound having a minimum of 13 carbon atoms.

27 Claims, No Drawings

PROCESS FOR PRODUCING SOLUTIONS OF SALTS OF WATER-SOLUBLE CARBOXYLIC ACIDS OF CATIONIC DYES OR OPTICAL BRIGHTENERS

The invention relates to a process for producing solutions of salts of water-soluble carboxylic acids of cationic dyes or optical brighteners, to the solutions of cationic dye salts or brightener salts which are obtained by this process and which are miscible with water in any proportion, and to the use of these solutions for preparing dye liquors and printing pastes for dyeing, optical brightening and printing of, in particular, synthetic textile materials.

As is known, the handling and use of cationic dyes or optical brighteners in the form of powders is accompanied by an unpleasant liberation of dust, an effect which is found by the personnel handling the powders to be troublesome and unhygienic, and which moreover leads to a continuous contamination of the premises, of the working area and of the equipment, and renders necessary the use of appropriate protective devices. Furthermore, it is frequently difficult to dissolve pulverulent cationic dyes or optical brighteners in water since they are not easily wetted and sometimes form lumps. The preparation of dye and brightener liquors is consequently made more difficult. There has therefore existed a need to overcome these disadvantages.

Various suggestions have already been made towards this end. It has thus been recommended that cationic dyes and optical brighteners be marketed in the form of aqueous or organic solutions, especially concentrated solutions.

The requirements which concentrated liquid commercial preparations have to satisfy are however numerous. They have to be miscible with water to an unlimited extent, and be able to withstand without decomposing a storage period of varying length, often at elevated temperatures. In many cases there is also a necessity to provide true solutions in a really narrow pH range. Any solvents being employed must not be readily volatile and must be as negligibly toxic as possible.

The production of liquid commercial forms of cationic dyes and optical brighteners has over a long period formed the subject matter of many inventions.

The cationic dyes and optical brighteners are frequently obtained on synthesis as salts of strong acids (especially sulfates, chlorides or methosulfates). As such they are usually difficulty soluble in water or in organic media. In order to overcome this disadvantage, it has therefore already been suggested to firstly produce from salts of strong acids of cationic dyes or optical brighteners the corresponding free dye or brightener bases, and to then convert these into salts of water-soluble carboxylic acids (for example acetic acid). These carboxylic acid salts (for example acetates) are dissolved in a solvent miscible with water in any proportion, such as in polyhydric alcohols and ethers and esters thereof, polyethers, amides, lactones, nitriles, dimethylsulfoxide, tetrahydrofuran or dioxane, in order to obtain on the one hand the desired liquid form, and on the other hand the desired solubility of the cationic dyes or brighteners.

There are however cationic dyes and optical brighteners with which it is not possible to produce the acetates in the stated manner from the corresponding salts of strong acids, because the dye and brightener bases are not stable or cannot be separated by precipitation.

The methods of obtaining salts of carboxylic acids by means of anion exchange or by reaction of the difficultly soluble carbonates or bicarbonates of cationic dyes with carboxylic acids have also already been suggested.

Whereas the ion exchange procedure is commercially very often uneconomical, the method by way of the bicarbonate is in most cases unsatisfactory because it is a two-stage method, and also because the bicarbonates frequently do not readily crystallise and cannot therefore be separated on a large commercial scale.

In the French patent specification No. 2,290,479, there is described a process in which the halides, particularly the chlorides, of cationic dyes are converted into salts of lower aliphatic carboxylic acids by being reacted, in an aqueous or anhydrous medium, at room temperature with lower aliphatic carboxylic acids and with an epoxide compound having a maximum of 12 carbon atoms.

It has now been found that higher epoxide compounds can be used instead of lower epoxide compounds.

Since the lower epoxide compounds are volatile, this can constitute a danger to health, if they are inhaled. The higher epoxide compounds on the other hand have a lower vapour pressure and on that account are not volatile. There is thus ensured an improvement in working hygiene, as well as greater safety with regard to danger of fire and explosion when the compounds are handled. Because the majority of higher epoxide compounds are bis- or tris-epoxide compounds, they are moreover more economical than the mono-epoxide compounds.

The present invention thus relates to a process for producing solutions of salts of water-soluble carboxylic acids of cationic dyes and of cationic optical brighteners, which process comprises reacting the halide of a cationic dye or brightener, in an aqueous or anhydrous medium, with at least one water-soluble carboxylic acid in the presence of an epoxide compound having a minimum of 13 carbon atoms.

Suitable dye salts or optical brightener salts for the process according to the invention are mainly the chlorides, but also the bromides, of cationic dyes and brighteners, such as occur in the production process, which salts are in most cases difficultly soluble in water and solvents, and cannot therefore be used for producing concentrated and storage-stable solutions by known methods.

By "difficultly soluble" in this context is meant that the dye salt is not sufficiently soluble to obtain therefrom a solution having a concentration high enough for a dye preparation.

The halides of cationic dyes and brighteners which are usable according to the invention are known and can be produced by known methods. From a chemical point of view, the dyes concerned are those containing a coloured cation and, as colourless anion, a halogen atom, especially a chlorine atom. The dyes can belong to the widest variety of chemical classes; they are for example azo dyes, such as monoazo, disazo and polyazo dyes, anthraquinone dyes, phthalocyanine dyes, diphenylmethane and triarylmethane dyes, naphtholactam, methine, polymethine and azomethine dyes, enamine, hydrazone, thiazole, aminoketone, acridine, cyanine, nitro, quinoline, benzimidazole, xanthene, azine and thiazine dyes. Preferred cationic dyes are azacyanine and oxazine dyes, as well as dyes having an external ammonium group.

Suitable optical brighteners are for example: quaternisation products of pyrazolines, naphthalimides, imidazoles (such as derivatives of benzimidazol-(2)-yl-2-benzofuran, of 5-phenyl-2-benzimidazol-(2)-yl-furan, or derivatives of coumarins having imidazole radicals in the 3- and/or 7-position), or triazoles (such as derivatives of coumarins having triazole radicals in the 3- and/or 7-position) having quaternisable tertiary nitrogen atoms, and also oxacyanine derivatives.

Suitable water-soluble carboxylic acids usable according to the invention are in particular water-soluble aliphatic, especially lower-aliphatic ($C_1$–$C_4$), carboxylic acids, such as water-soluble saturated and unsaturated aliphatic mono- and polycarboxylic acids, which can be optionally substituted. Suitable substituents are particularly halogen, such as chlorine, bromine and fluorine, alkoxy, preferably hydroxyl, and also unsubstituted or substituted phenyl. By poly-carboxylic acids are meant above all di- and tri-carboxylic acids. It is also possible to use mixtures of these water-soluble carboxylic acids.

In the case of the saturated, water-soluble aliphatic monocarboxylic acids, these are for example saturated unsubstituted monocarboxylic acids, such as formic acid, acetic acid, propionic, n-valeric and capric acid, and also substituted lower monocarboxylic acids, such as glycolic acid and lactic acid, halogen-substituted lower-aliphatic monocarboxylic acids, such as fluoroacetic acid, chloroacetic acid, bromoacetic acid, iodoacetic acid, dichloro- and trichloroacetic acid, α-chloropropionic acid and β-chloropropionic acid, as well as methoxyacetic acid, cyanoacetic acid, glyoxalic acid and phenylacetic acid.

Examples of unsubstituted or substituted dicarboxylic acids are oxalic acid, malonic acid, succinic acid, glutaric acid, adipic acid, tartaric acid and malic acid. Citric acid may be mentioned as an example of a tricarboxylic acid.

Examples of unsaturated monocarboxylic acids which may be mentioned are acrylic and methacrylic acid and vinylacetic acid. The maleic acid and fumaric acid may be mentioned as examples of unsaturated dicarboxylic acids.

Substituted and unsubstituted lower-aliphatic carboxylic acids, particularly formic or acetic acid, are advantageously used.

These carboxylic acids can be used in the form of aqueous solutions (for example 20 to 99.5% aqueous solutions). The carboxylic acid is advantageously used in an excess, especially of 30 to 2000%, particularly of 110 to 500%, preferably of 110 to 300%, relative to the anions to be reacted, in order to ensure a quantitative course of reaction. With the use of liquid carboxylic acids, it is also possible to perform the reaction without water.

The widest range of epoxide compounds can be used according to the invention. They are for example monoepoxide compounds having at least 13 carbon atoms in the molecule, such as reaction products of epichlorohydrin with saturated and unsaturated aliphatic, aromatic or araliphatic alcohols and phenols; diepoxide compounds such as dialkylene dioxides, and reaction products of epichlorohydrin with dialcohols, polyalkylene glycols or heterocyclic compounds; and also triepoxide compounds. Polyepoxide compounds, particularly di- and triepoxides, are preferred.

The epoxide compound is likewise advantageously used in excess. The excess is approximately between 10 and 300%, preferably between 10 and 200%, of the theoretical amount, relative to the anions to be reacted.

Suitable monoepoxides are for example saturated and unsaturated products of alcohols and phenols with epichlorohydrin, such as compounds of the formula

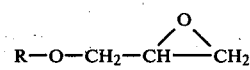

in which R is an aliphatic, aromatic or araliphatic radical having at least 10 carbon atoms.

Suitable diepoxides are for example dialkylene dioxides such as the compounds of the general formula

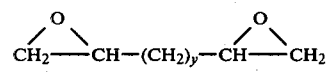

in which y is a number of at least 9.

Reaction products of epichlorohydrin with dialcohols are for example compounds of the general formula

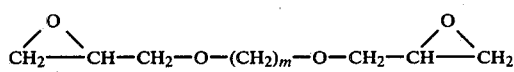

in which m is a number of at least 7.

Reaction products of epichlorohydrin with polyalkylene glycols are for example compounds of the general formula

in which n is a number from 3 to 10 inclusive, and R is H or $CH_3$, and if R is H, n is at least 4, for example the compound wherein R is H, and n~6 to 7.

Reaction products of epichlorohydrin with heterocyclic compounds are for example the diepoxide compounds of the general formula

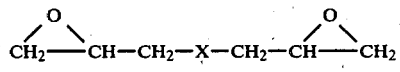

in which X is a bivalent heterocyclic radical containing at least 7 carbon atoms, such as the compound of the formula

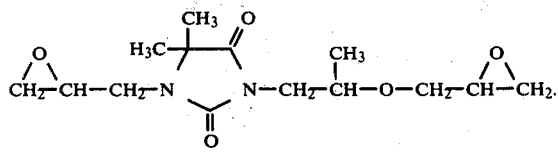

A suitable triepoxide which may be mentioned is for example the triepoxide compound of the formula

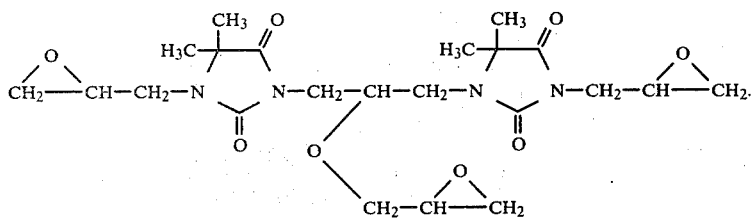

The process according to the invention is preferably performed in the following manner:

The halide of the cationic dye or brightener is firstly introduced at room temperature, optionally in the form of an aqueous solution, into the water-soluble carboxylic acid or mixture of carboxylic acids, preferably present in excess; and the whole is well stirred for ½ to 1 hour by means of stirring devices customary in industry, such as stirrers and turbomixers. The epoxide compound, advantageously in excess, is then slowly added dropwise. The temperature can rise slightly during this stage. At the end, the amount of free halide is determined by titration. The reaction mixture is stirred for about 30 minutes to 1 hour. It can then be optionally heated to 100° C., advantageously to 30° to 70° C., and particularly to about 35° to 60° C., and held for about 1 to 4 hours at this temperature. The excess of epoxide compound can be optionally removed by the addition of the amount of hydrohalic acid exactly necessary to effect this, particularly hydrochloric acid. It is in many cases advantageous to thereupon clear the solution obtained of any inorganic residues present by filtration. In order to obtain the depth of colour and the concentration required, the solution can if necessary be subsequently diluted with water or with organic solvent.

A solution of the cationic dye or brightener salt of a water-soluble carboxylic acid is obtained by this procedure. This solution can be used directly as a dye or brightener preparation without further processing. These cationic dye or brightener solutions obtained according to the invention are stable in storage over a period of 3 to 12 months, are unaffected by changes of temperature of −10° C. to +40° C., and are concentrated to the extent that they contain about 10 to 50% of the salt of a water-soluble carboxylic acid, particularly of an acetate, of the cationic dye or brightener.

Any concentration desired can be obtained by concentrating the resulting solutions by evaporation.

The principal advantage of the process according to the invention is that concentrated solutions, which are directly ready for use, are already obtained in the production process.

A further advantage of the process according to the invention is that the course of the reaction can be precisely traced by measuring the decrease of the free halide (determinable by simple titration), and that finally the amount of acid excess used can be such that the pH of the reaction solution attains a specific value (for example 4 to 5). By this means it is possible, on subsequent application of the solution, to obtain the desired strength by simply adding water or organic solvent, thus avoiding the troublesome handling of acid in the works.

The solutions obtainable according to the present invention can be freely mixed with other like dye or brightener preparations without the anions being affected, that is to say, without storage stability being impaired. Consequently, these solutions are excellently suitable for producing so-called premixes.

The solutions obtainable according to the invention are storage-stable preparations which are ready for use. They have very good solubility in water and, diluted with water and also with organic solvent to the desired degree, can be used directly as liquor for dyeing, optically brightening or printing organic materials, such as leather, wool, silk, cellulose acetate, tannin-treated cotton, or paper, and especially textile material made from acid-modified hydrophobic synthetic fibres, for example acid-modified polyamide, polyurethane, polypropylene and polyester, particularly however fibre material made from acid-modified polyacrylonitrile.

By the addition of suitable thickening agents, there are obtained moreover thickened solutions which are excellently suitable for use in continuous dyeing and printing processes.

The Examples which follow serve to illustrate the invention, but its scope is not limited to them. The term 'parts' denotes parts by weight, percentages are given in percent by weight, and the temperatures in degrees Centigrade.

EXAMPLE 1

30.75 g of the dye of the formula

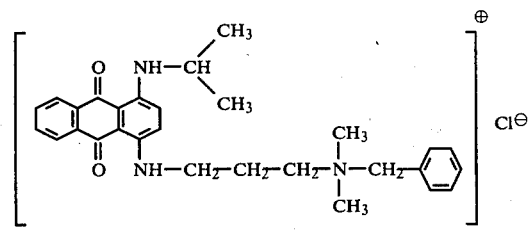

is suspended in 18.75 g of glacial acetic acid, and at room temperature is added 34.2 g of an epoxide of the formula

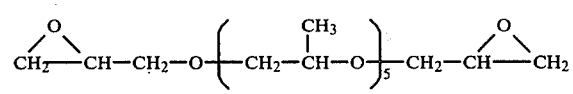

having an epoxide content of 2.93 gram-equivalents/kg. The mixture is subsequently stirred for 30 minutes, and is then heated for 4 hours at 50° to 55°. After the addition of 4.5 g of water and cooling, there is obtained a stable, approximately 37% dye acetate solution which, on being filtered until clear, leaves no residue behind;
  ionogenic chlorine found: 0%
  calculated before the reaction: 2.52%
  calculated conversion: 100%.

In this manner is obtained a concentrated dye solution which is ready for use, stable in storage and unaffected by changes of temperature.

A dye acetate solution is likewise obtained by using, instead of the dye chloride, the dye bromide or dye iodide, using otherwise the same procedure.

By using in the above example, instead of the diepoxide compound, equimolar amounts, relative to the epoxide content, of the compound of the formula

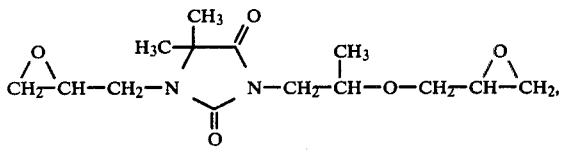

or of the triepoxide of the formula

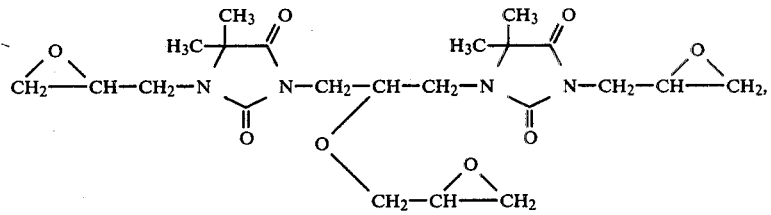

with otherwise the same procedure, there are likewise obtained solutions which are stable in storage and which contain the dye acetate at the same concentration.

EXAMPLE 2

10 parts of the dye given in Example 1 are suspended in 8 parts of water and 2 parts of lactic acid, and 6.6 parts of a bis-epoxide mixture of the average formula

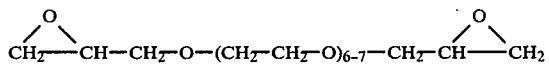

are added. An addition of 3.4 parts of water is made, and the mixture is heated at 50° for 2 hours. The mixture is then cooled to obtain an approximately 35% dye lactate solution which, on being filtered until clear, leaves no residue behind;

ionogenic chlorine found: 0.18%
calculated before the reaction: 2.4%
calculated conversion: 92.5%.

The dye solution obtained is directly ready for use, and over a period of months is storage stable and is unaffected by changes of temperature.

Solutions containing the corresponding dye carboxylic acid salt at the same concentration are obtained by using in the above example, instead of lactic acid, equimolar amounts of formic acid, propionic acid, acrylic acid, hydroxyacetic acid, chloroacetic acid, oxalic acid, malonic acid, succinic acid, tartaric acid, malic acid or citric acid, the procedure used being otherwise the same.

DYEING INSTRUCTIONS 3 parts of a dye solution obtained according to Example 1 are dissolved in 2000 parts of water, with the addition of 4 parts of 40% acetic acid, 1 part of crystallised sodium acetate and 10 parts of anhydrous sodium sulfate. Into this dye bath at 60° are introduced 100 parts of dried yarn made from polyacrylonitrile staple fibres; the temperature is increased within half an hour to 100°, and dyeing is performed for one hour at boiling temperature. The dyeing is then well rinsed and finally dried.

A level blue dyeing having excellent fastness properties is obtained:

We claim:

1. A process for producing solutions of salts of water-soluble carboxylic acids of cationic dyes or of cationic optical brighteners, which process comprises reacting the halide of a cationic dye or brightener, in an aqueous or anhydrous medium, with at least one water-soluble carboxylic acid in the presence of an epoxide compound having a minimum of 13 carbon atoms.

2. A process according to claim 1, wherein the halide used is the chloride of the dye or brightener.

3. A process according to claim 1, wherein at least one water-soluble aliphatic carboxylic acid is used.

4. A process according to claim 3, wherein the carboxylic acid used is a substituted or unsubstituted lower aliphatic carboxylic acid.

5. A process according to claim 3, wherein the carboxylic acid used is a monocarboxylic acid.

6. A process according to claim 3, wherein the carboxylic acid used is a dicarboxylic acid.

7. A process according to claim 3, wherein the carboxylic acid used is a tricarboxylic acid.

8. A process according to claim 1, wherein the reaction is performed in aqueous carboxylic acid.

9. A process according to claim 1, wherein the reaction is performed in anhydrous liquid carboxylic acid.

10. A process according to claim 1, wherein a 30 to 2000% excess of carboxylic acid is used.

11. A process according to claim 5, wherein the water-soluble aliphatic carboxylic acid used is formic acid or acetic acid.

12. A process according to claim 1, wherein a mixture of carboxylic acids is used.

13. A process according to claim 1, wherein an excess of 10 to 300% of epoxide compound is used.

14. A process according to claim 1, wherein the epoxide compounds used are alkylene oxides having at least 13 carbon atoms.

15. A process according to claim 14, wherein the epoxide compounds used are unsubstituted alkylene oxides having at least 13 carbon atoms.

16. A process according to claim 1, wherein the epoxide compounds used are reaction products of epichlorohydrin with aliphatic alcohols or phenols.

17. A process according to claim 1, wherein polyepoxide compounds are used.

18. A process according to claim 1, wherein the epoxide compounds used are reaction products of epichlorohydrin with dialcohols.

19. A process according to claim 1, wherein the epoxide compounds used are reaction products of epichlorohydrin with polyalkylene glycols.

20. A process according to claim 1, wherein the epoxide compounds used are reaction products of epichlorohydrin with heterocyclic compounds.

21. A process according to claim 1, wherein the solution obtained is subsequently diluted with water.

22. A process according to claim 1, wherein the solution obtained is subsequently diluted with an organic solvent.

23. A liquid dye preparation or brightener preparation obtained according to the process of claim 1.

24. A liquid dye preparation or brightener preparation according to claim 23, which contains 10 to 50% of at least one salt of a water-soluble carboxylic acid, particularly of an acetate, of a cationic dye or optical brightener.

25. Method to use the dye preparation or a brightener preparation of claim 23, for producing dye or brightener liquors and printing pastes having an aqueous base or an organic solvent base.

26. Method to use the dye or brightener liquors and printing pastes of claim 25, for dyeing, optically brightening or printing synthetic textile materials.

27. Method to use the dye or brightener liquors and printing pastes of claim 26, for dyeing, optically brightening or printing polyacrylonitrile.

* * * * *